(12) United States Patent
Miller et al.

(10) Patent No.: US 6,905,396 B1
(45) Date of Patent: Jun. 14, 2005

(54) METHOD OF REMOVING A COATING FROM A SUBSTRATE

(75) Inventors: Mitch O. Miller, Clover, SC (US); John F. Rugh, Jr., Middletown, CT (US)

(73) Assignee: Huffman Corporation, Clover, SC (US)

( * ) Notice: Subject to any disclaimer, the term of this patent is extended or adjusted under 35 U.S.C. 154(b) by 0 days.

(21) Appl. No.: 10/717,842

(22) Filed: Nov. 20, 2003

(51) Int. Cl.$^7$ .................................. B24B 1/00
(52) U.S. Cl. ............................. 451/38; 451/75
(58) Field of Search .............................. 451/26, 37, 38, 451/39, 40, 60

(56) References Cited

U.S. PATENT DOCUMENTS

| | | | |
|---|---|---|---|
| 5,167,721 A | 12/1992 | McComas et al. | |
| 5,509,971 A * | 4/1996 | Kirschner | 134/7 |
| 5,571,335 A * | 11/1996 | Lloyd | 134/1 |
| 5,702,288 A * | 12/1997 | Liebke et al. | 451/36 |
| 5,704,824 A | 1/1998 | Hashish et al. | |
| 6,609,955 B1 * | 8/2003 | Farrow | 451/38 |
| 2003/0148710 A1 * | 8/2003 | Esser et al. | 451/39 |

* cited by examiner

*Primary Examiner*—Dung Van Nguyen
(74) *Attorney, Agent, or Firm*—Kennedy Covington Lobdell & Hickman, LLP

(57) ABSTRACT

Metallic and ceramic coatings, particularly diffusion and metallurgically bonded coatings, such as are applied to aircraft, turbine, pump and valve components, may be effectively removed regardless of the three-dimensional configuration of the component and without damage to the underlying component by impinging the coating with a pressurized abrasive water jet while moving the abrasive water jet and/or the component relative to one another to fully expose the coating to the fluid stream.

8 Claims, 2 Drawing Sheets

METHOD OF REMOVING A COATING FROM A SUBSTRATE

BACKGROUND OF THE INVENTION

The present invention relates generally to methods for the removal of coatings from substrates and, more particularly, to a novel method for removing metallurgically bonded coatings from a substrate, such as a machine part, in which the coating may often be harder than the substrate.

In the manufacture of many machine parts, it is commonplace to apply a metallic or ceramic coating to improve the various physical characteristics of the part, such as surface hardness, heat resistance and wearability. For example, in the manufacture of aircraft, turbine engine, and pump and valve components, it is commonplace to apply a metallic and/or ceramic surface coating or coatings to the components, often in such a manner as to establish a diffusion or metallurgical bond between the component and the coating.

In turbine components, in particular, it is typical to apply a metallic coating, such as a so-called "MCrAlY" coating comprised of a metal (typically nickel or cobalt), chromium, aluminum, and yttrium, which provides advanced oxidation and corrosion resistance, which is often diffusion bonded to the surface of the component. In the hottest environments, a thermal barrier coating (TBC) outwardly bonded over the metallic coating is also applied.

When such components require repair or refurbishment, such coatings must be initially removed from the substrate component to which they are bonded. Since the coatings in many cases are harder than the material of the underlying component, the removal of the coatings presents the difficult problem of fully removing the coating without damaging the underlying component.

Several different techniques and methods are utilized conventionally to remove such coatings. In some cases, the coating may be mechanically machined or ground from the surface of the underlying component, but this technique is feasible essentially only as to components having a uniformly flat or curved (e.g., cylindrical) geometrical shape which has not become distorted during use, which is seldom the case with turbine engine components. An alternative removal technique is to subject the component surface to grit blasting, sometimes commonly referred to as sandblasting. Grit blasting accomplishes satisfactory results when the coating is softer or more brittle than the material of the underlying component, but is generally infeasible when the coating is harder than the underlying component. It is also known to use a high pressure water jet for stripping of coatings, but this process is effective only as to coatings which are only mechanically bonded to the underlying component, and is generally ineffective for removing diffusion or metallurgically bonded coatings. A chemical solution, ordinarily an acid solution, can also be utilized to remove a coating from an underlying base component, but such chemical stripping techniques pose environmental problems and also are generally effective only when a suitable chemical is available to preferentially attack the coating without damaging the underlying material of the base component.

Accordingly, a need exists for an improved methodology by which diffusion and other metallurgically bonded coatings may be removed from an underlying component, especially coatings which may be harder than the material of the underlying component or more resistant to stripping acid or other chemical stripping solution than the underlying component.

SUMMARY OF THE INVENTION

It is accordingly an object of the present invention to provide an improved method of removing coatings from substrates, which will overcome the problems of the prior art.

Briefly summarized, the present invention contemplates a method by which a coating may be removed from a substrate by impinging the coating with a pressurized fluid stream comprising a mixture of a liquid and an abrasive, while moving one or both of the fluid stream and the substrate relative to the other so as to fully expose the coating to the fluid stream.

The method of the present invention is particularly adapted to the removal of coatings which are bonded to the substrate, especially metallurgically or diffusion bonded coatings of a metallic or ceramic material or a combination thereof and, in particular, coatings which may be harder than the underlying substrate or unable to be completely removed by preferentially attacking the coating by an acid or other chemical stripping solution.

While any of various liquids may perform effectively in accomplishing the method of the present invention, it is contemplated that water will typically be the preferred liquid. It is also preferred that, following the removal of the coating from the substrate by the abrasive liquid jet impingement, an additional step may be performed of impinging the substrate with a non-abrasive liquid jet, e.g., a jet of water only, to clean the substrate of any residual abrasive material or other contaminants.

It is additionally preferred that, in moving one or both of the fluid stream and the substrate relative to one another, the motion is conformed to the surface configuration of the substrate in order to maintain a consistent spatial orientation between the fluid stream and the substrate. The speed of movement of the fluid stream and/or the substrate and the mixture ratio between the liquid and the abrasive are also regulated in order to control the rate and degree of removal of the coating.

DESCRIPTION OF THE PREFERRED EMBODIMENT

Figure 1:
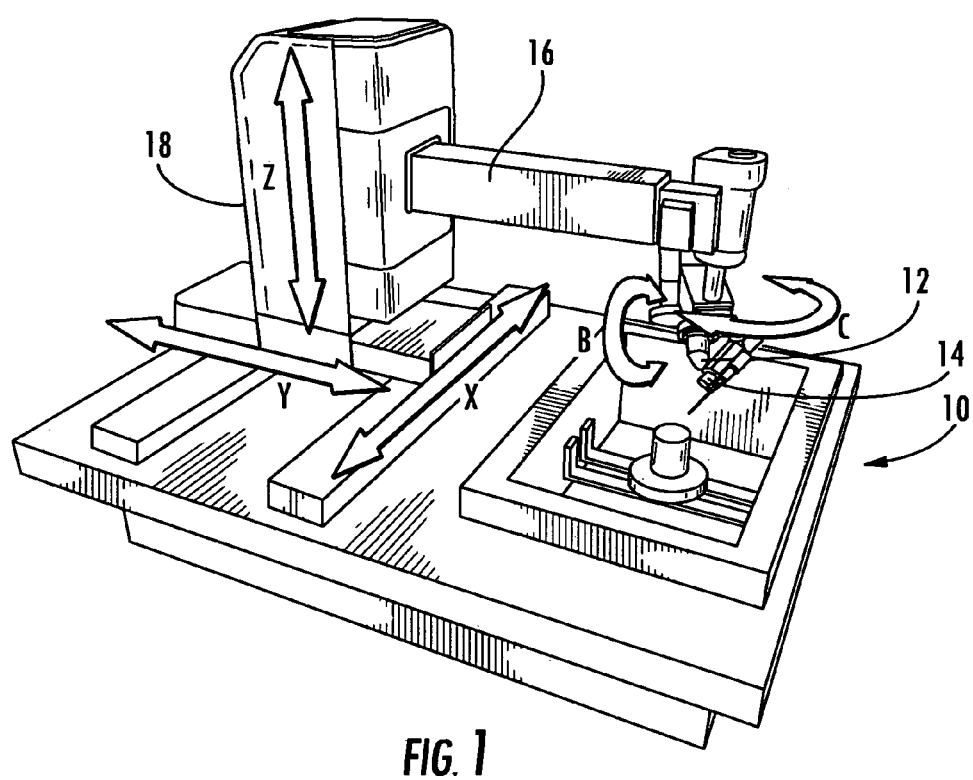
FIG. 1 is a schematic perspective view of a water jet machine suitable for use in performing the coating removal method of the present invention.

Referring now to the accompanying drawings and initially FIG. 1, a water jet machine suitable for use in performing the method of the present invention is depicted and identified overall at 10. However, while a suitable water jet machine 10 is herein illustrated and described, it will be readily recognized and is to be understood by persons skilled in the relevant art that the present invention does not reside in the machinery used to perform the present method. Any of various known water jet machinery may be suitable and effective for use in performing the methodology of the present invention. Accordingly, the water jet machine 10 is herein described and depicted only by way of illustrative example for purposes of providing an enabling disclosure of the present invention to persons skilled in the relevant art. The water jet machine 10 and, in particular, its described structure and function does not constitute and is not to be construed as limiting the scope and substance of the present invention.

Figure 3:
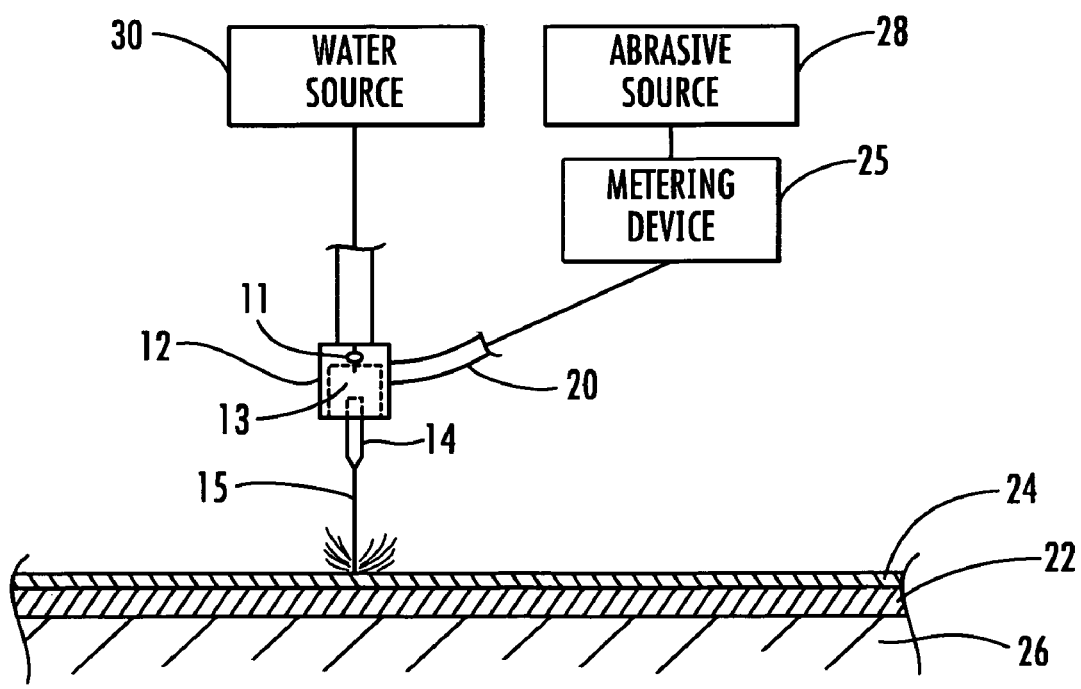
FIG. 3 is a schematic side elevational view of the nozzle assembly of the water jet machine of FIG. 1 depicting the performance of the coating removal method of the present invention on the air foil component of FIG. 2.

The water jet machine 10 is equipped with a high capacity pump (not shown) capable of delivering a liquid supply 30, typically water, at a high rate of pressure to a jet orifice 11 supported within a distribution head 12 which defines internally a mixing chamber 13 from which the pressurized liquid is delivered into and through a delivery nozzle 14, commonly referred to in the industry as a focusing tube, to be emitted at a correspondingly high force, e.g., in the range of 5,000 psi to 55,000 psi, in a linear jet stream 15 (FIG. 3). The distribution head 12 and the nozzle 14 are supported on a cantilevered arm 16 from an upright movable stanchion 18 for controlled reciprocatory movement of the distribution head 12 and the nozzle 14 about multiple axes of movement, e.g., horizontally in perpendicularly oriented directions of movement as signified by axes X and Y and vertically as signified by axis Z. In addition, appropriate motors (not shown) may also be provided on the cantilevered arm 16 for associated rotary motion of the distribution head 12 and the nozzle 14, e.g., about perpendicularly oriented rotational axes represented by axes B and C.

The machine 10 preferably includes a programmable controller (not shown), preferably a computer numerical controller, for controlling and synchronizing movement of the distribution head 12 and the nozzle 14 about such multiple axes of motion, whereby the distribution head 12 and the nozzle 14 may be selectively controlled three-dimensionally in substantially any orientation and path of motion.

In addition, the distribution head 12 is equipped with an additional input hose or tube 20 for delivering a supplementary or additional material into the pressurized liquid for intimate mixing therewith in formation of the jetted fluid stream 15. Substantially any flowable material, whether liquid, gas or solid, may be delivered via the tube 20 for mixing with the primary water or other liquid material.

In FIG. 3, the distribution head 12 and the nozzle 14 are depicted schematically in a preferable embodiment according to the novel method of the present invention in which a supply of a flowable abrasive material 28 is delivered through a metering device 25 via the tube 20 to be drawn by venturi effect into the mixing chamber 13 for mixing with a primary pressurized stream of water 30 in the formation of the jetted fluid stream 15. Such abrasive materials are well known within the art and substantially any of various forms of such abrasive materials are contemplated to be suitable for use in performing the method of the present invention. By way of example but without limitation, appropriate abrasive materials may be garnet, aluminum oxide, silicon carbide, glass beads, etc.

While the use of abrasive water jet systems are known, the only conventionally accepted use of an abrasive water jet is to perform a cutting, drilling, milling or turning operation, such as disclosed by way of example in U.S. Pat. No. 5,704,824. In turn, conventional wisdom is that an abrasive water jet would be too aggressive for use in stripping a coating from a machine component without substantial risk of damage to the underlying component.

Figure 2:
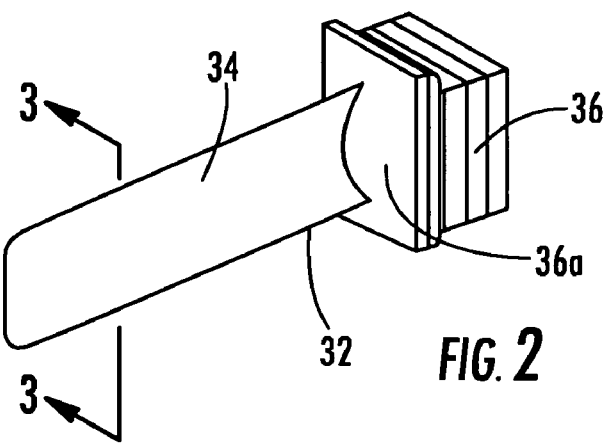
FIG. 2 is a schematic perspective view of a typical turbine air foil component for which the coating may be advantageously removed via the process of the present invention.

In substantial contrast, it is contemplated under the present invention to use an abrasive water jet, such as that described above to be produced by the water jet machine 10, in a method for removing a coating bonded to a substrate, most particularly, metallic and ceramic coatings which are diffusion or metallurgically bonded to an underlying body of a base metal, such as commonly applied to aircraft components, turbine engine components, and other industrial machine parts to impart wear resistance, heat resistance, oxidation and corrosion resistance characteristics. Representative examples of such coatings include a diffused aluminide coating applied to a base metal component or a so-called "MCrAlY" overlay coating comprising a metal, typically either nickel or cobalt, chromium, aluminum and yttrium which coating is similarly diffusion bonded metallurgically to an underlying base metal component. FIG. 2 depicts by way of example but without limitation a common form of turbine component 32, commonly referred to as an air foil, on which such coatings are typically applied. As is known, the air foil 32 includes a curved elongate blade 34 supported by and extending outwardly from a base 36, referred to as a root. The blade 34 and the flat platform surface 36a of the root 36 are typically coated in the manner described above.

In FIG. 3, the blade 34 of the air foil 32 is shown schematically in cross section to representatively depict such coatings as may be commonly applied to such turbine engine components, wherein a first metallic coating 22, such as an MCrAlY overlay coating, is diffusion bonded metallurgically to the bare base metal 26 of a turbine part and then overcoated with a ceramic material to provide a so-called "TBC" thermal barrier coating 24. As indicated above, it is difficult if not impossible to effectively remove such coatings without risking damage to the underlying base metal component 26 by conventional means such as grinding, dry grit blasting, chemical stripping, or unaided water jet stripping. However, it has been discovered that, by the use of the novel methodology of the present invention, it is possible to remove fully and effectively the entirety of such coatings without damaging the underlying component 26.

Specifically, the present invention, as described above, utilizes an abrasive water jet 15 wherein a high pressure stream of water intimately mixed with an abrasive material is applied via a controllably movable jet nozzle, such as the nozzle or focusing tube 14. The use of the abrasive water jet 15 provides sufficient force and abrasive character to remove substantially any bonded coating, even ceramic and metallic coatings which may be diffusion or metallurgically bonded to the underlying metal component and which may be harder than the metal of the underlying component.

The control of the movement of the abrasive water jet 15 is critical to the effective performance of the present method. By the controlled motion of the jet nozzle 14 selectively about the multiple axes B, C, X, Y, Z it is possible to reciprocate the jet nozzle 14 in a three-dimensional path of movement precisely conforming to the three-dimensional configuration and shape of substantially any coated component as a workpiece while maintaining the nozzle 14 at a precisely consistent spacing and angular orientation with respect to the component. This level of controlled motion of the jet nozzle 14 is critical to balancing the mutually competing objectives of removing the surface coatings 22, 24 while avoiding damage to the underlying base component 26. The three dimensional character of the air foil 32 well exemplifies the criticality of controlling the motion of the jet nozzle 14 in conformity to the shape and configuration of the component. Those persons skilled in the relevant art will readily recognize and understand that other variables which may be selectively set, varied and controlled may be the pressure of the abrasive water jet stream 15 as emitted from the nozzle 14, the mixing ratio of the abrasive with respect to the water, the shape and relative diffusion of the fluid stream 15, etc. Empirical determination and setting of these variables is well within the level of skill of persons in the relevant art.

It will be understood that the high levels of pressurized force exerted by the abrasive water jet 15 will often leave a residual amount of the abrasive material embedded in the surface of the substrate 26 after removal of the coatings 22, 24 therefrom. It is accordingly desirable to remove this residual abrasive material before the component is repaired or refurbished with a new coating. Accordingly, the method of the present invention also contemplates that, following the removal of the coating from the substrate by the abrasive liquid jet impingement, an additional step may be performed of impinging the substrate with a non-abrasive liquid jet, e.g., a jet of water only, to clean the substrate of any residual abrasive material.

The advantages of the present invention in comparison to the pre-existing state of the relevant art will therefore be readily recognized and understood. The methodology of the present invention is not limited by the geometric configuration or shape of a coated component to be stripped, nor the relative hardness of the coating with respect to that of the base metal of the underlying component, nor the thickness, layering or chemical composition of the coating or coatings on the component. Likewise, the method of the present invention is equally effective in removing oxidation, corrosion or other damage to a component. The present method also does not pose any environmental hazard and, indeed, water jet machines such as suitable for use in the present method commonly are equipped with systems for complete containment of the abrasive water jet and recycling thereof to the extent possible.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A method of removing a coating from a substrate, comprising the steps of impinging the coating with a pressurized fluid stream comprising a mixture of a liquid and an abrasive, while moving at least one of the fluid stream and the substrate relative to the other thereof to fully expose the coating to the fluid stream, wherein the coating is diffusion or metallurgically bonded to the substrate.

2. A method of removing a coating from a substrate according to claim 1, comprising the steps of impinging the coating with a pressurized fluid stream comprising a mixture of a liquid and an abrasive, while moving at least one of the fluid stream and the substrate relative to the other thereof to fully expose the coating to the fluid stream, wherein the coating is a metallic material.

3. A method of removing a coating from a substrate, comprising the steps of impinging the coating with a pressurized fluid stream comprising a mixture of a liquid and an abrasive, while moving at least one of the fluid stream and the substrate relative to the other thereof to fully expose the coating to the fluid stream, wherein the coating is a ceramic material.

4. A method of removing a coating from a substrate, comprising the steps of impinging the coating with a pressurized fluid stream comprising a mixture of a liquid and an abrasive, while moving at least one of the fluid stream and the substrate relative to the other thereof to fully expose the coating to the fluid stream, wherein the coating is harder than the substrate.

5. A method of removing a coating from a substrate, comprising the steps of impinging the coating with a pressurized fluid stream comprising a mixture of a liquid and an abrasive, while moving at least one of the fluid stream and the substrate relative to the other thereof to fully expose the coating to the fluid stream, wherein the coating comprises a metallic layer and a ceramic layer.

6. A method of removing a coating from a substrate, comprising the steps of impinging the coating with a pressurized fluid stream comprising a mixture of a liquid and an abrasive, while moving at least one of the fluid stream and the substrate relative to the other thereof to fully expose the coating to the fluid stream, wherein the moving step comprises conforming the moving of the at least one of the fluid stream and the substrate to a surface configuration of the substrate for maintaining a consistent spatial orientation between the fluid stream and the substrate.

7. A method of removing a coating from a substrate, comprising the steps of impinging the coating with a pressurized fluid stream comprising a mixture of a liquid and an abrasive, while moving at least one of the fluid stream and the substrate relative to the other thereof to fully expose the coating to the fluid stream, wherein the moving step comprises controlling the speed of the moving.

8. A method of removing a coating from a substrate, comprising the steps of impinging the coating with a pressurized fluid stream comprising a mixture of a liquid and an abrasive, while moving at least one of the fluid stream and the substrate relative to the other thereof to fully expose the coating to the fluid stream, wherein, following the removal of the coating from the substrate by the abrasive liquid jet impingement, impinging the substrate with a non-abrasive liquid jet to clean the substrate of any residual contaminants, including any residual abrasive material.

* * * * *

UNITED STATES PATENT AND TRADEMARK OFFICE
CERTIFICATE OF CORRECTION

PATENT NO. : 6,905,396 B1
DATED : June 14, 2005
INVENTOR(S) : Mitch O. Miller and John F. Rugh, Jr.

It is certified that error appears in the above-identified patent and that said Letters Patent is hereby corrected as shown below:

Column 6,
Line 5, delete "according to claim 1,".

Signed and Sealed this

Twentieth Day of September, 2005

JON W. DUDAS
*Director of the United States Patent and Trademark Office*